(12) United States Patent
Gustafsson et al.

(10) Patent No.: US 10,901,792 B2
(45) Date of Patent: Jan. 26, 2021

(54) DISTRIBUTION OF RESOURCES AMONG ACTOR INSTANCES

(71) Applicant: Telefonaktiebolaget LM Ericsson (publ), Stockholm (SE)

(72) Inventors: Harald Gustafsson, Lund (SE); Fredrik Svensson, Malmö (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/463,874

(22) PCT Filed: Nov. 29, 2016

(86) PCT No.: PCT/EP2016/079127
§ 371 (c)(1),
(2) Date: May 24, 2019

(87) PCT Pub. No.: WO2018/099538
PCT Pub. Date: Jun. 7, 2018

(65) Prior Publication Data
US 2019/0384639 A1    Dec. 19, 2019

(51) Int. Cl.
*G06F 15/173* (2006.01)
*G06F 9/50* (2006.01)
(Continued)

(52) U.S. Cl.
CPC ........ *G06F 9/5027* (2013.01); *G06F 9/45558* (2013.01); *G06F 9/5072* (2013.01);
(Continued)

(58) Field of Classification Search
None
See application file for complete search history.

(56) References Cited

U.S. PATENT DOCUMENTS

| 5,408,663 A | 4/1995 | Miller |
| 5,974,438 A | 10/1999 | Neufeld |

(Continued)

FOREIGN PATENT DOCUMENTS

| WO | 2006068943 A2 | 6/2006 | |
| WO | WO-2006068943 A2 * | 6/2006 | ........... G06F 9/4887 |

OTHER PUBLICATIONS

Elmroth, Erik, et al., "Accounting and Billing for Federated Cloud Infrastructures", Aug. 2009, 1-8.
(Continued)

*Primary Examiner* — Phyllis A Book
(74) *Attorney, Agent, or Firm* — Murphy, Bilak & Homiller, PLLC (57) ABSTRACT

There is provided mechanisms for distributing resource units among instances of actors. A method is performed by a requesting runtime environment. The method comprises providing, to responding runtime environments, a request for resource units to be used by at least one of the instances when run by the requesting runtime environment. The method comprises obtaining, from the responding runtime environments, indications of amount of resource units made available from a respective one of the responding runtime environments to the requesting runtime environment. The method comprises determining, based on the obtained indications, individual amounts of resource units required by the requesting runtime environment from each of the responding runtime environments. The method comprises indicating, to the responding runtime environments, said individual amounts of resource units required by the requesting runtime environment.

22 Claims, 6 Drawing Sheets

(51) Int. Cl.
  *G06F 9/455* (2018.01)
  *H04L 12/24* (2006.01)
  *H04L 12/26* (2006.01)
  *H04L 29/08* (2006.01)

(52) U.S. Cl.
  CPC ...... *H04L 41/0896* (2013.01); *H04L 43/0876* (2013.01); *H04L 67/12* (2013.01); *G06F 2009/4557* (2013.01)

(56) References Cited

U.S. PATENT DOCUMENTS

| | | | |
|---|---|---|---|
| 7,386,850 B2 | 6/2008 | Mullen | |
| 8,312,460 B1 | 11/2012 | Blanding | |
| 9,009,722 B2 | 4/2015 | Bello et al. | |
| 9,342,361 B2* | 5/2016 | Strohbach | G06F 9/5027 |
| 9,529,644 B1 | 12/2016 | Verma | |
| 10,031,774 B2 | 7/2018 | Chen | |
| 10,168,953 B1 | 1/2019 | Gupta et al. | |
| 2003/0056084 A1* | 3/2003 | Holgate | G06F 9/548 |
| | | | 712/29 |
| 2005/0075957 A1 | 4/2005 | Pincus et al. | |
| 2005/0192937 A1 | 9/2005 | Barsness et al. | |
| 2007/0206511 A1* | 9/2007 | Purpura | H04L 41/00 |
| | | | 370/252 |
| 2008/0080374 A1 | 4/2008 | Nuzman et al. | |
| 2008/0162481 A1 | 7/2008 | Sadjadi | |
| 2008/0295096 A1 | 11/2008 | Beaty et al. | |
| 2009/0172461 A1* | 7/2009 | Bobak | G06F 11/0793 |
| | | | 714/2 |
| 2009/0172674 A1* | 7/2009 | Bobak | G06F 11/1482 |
| | | | 718/101 |
| 2010/0223385 A1 | 9/2010 | Gulley et al. | |
| 2011/0154353 A1 | 6/2011 | Theroux et al. | |
| 2011/0196968 A1 | 8/2011 | Kobayashi et al. | |
| 2012/0173477 A1 | 7/2012 | Coutts et al. | |
| 2013/0104140 A1 | 4/2013 | Meng et al. | |
| 2013/0160011 A1* | 6/2013 | Corrie | G06F 9/45558 |
| | | | 718/1 |
| 2013/0160022 A1 | 6/2013 | Blight et al. | |
| 2014/0282582 A1 | 9/2014 | Clark et al. | |
| 2015/0052250 A1 | 2/2015 | Doganata et al. | |
| 2015/0067688 A1 | 3/2015 | Nagasawa et al. | |
| 2015/0304414 A1 | 10/2015 | Jasperson et al. | |
| 2016/0085738 A1* | 3/2016 | Briggs | G06F 3/0482 |
| | | | 715/219 |
| 2016/0112475 A1 | 4/2016 | Lawson et al. | |
| 2016/0379130 A1* | 12/2016 | Brown | H04L 67/00 |
| | | | 706/52 |
| 2017/0032000 A1 | 2/2017 | Sharma et al. | |
| 2017/0109199 A1 | 4/2017 | Chen | |
| 2017/0339008 A1* | 11/2017 | Dion | G06F 9/5072 |
| 2017/0364136 A1 | 12/2017 | Nandha Premnath et al. | |
| 2018/0032410 A1* | 2/2018 | Kang | G06F 9/45558 |

OTHER PUBLICATIONS

Hewitt, Carl, "Actor Model of Computation: Scalable Robust Information Systems", http://arxiv.org/abs/1008.1459 Accessed Nov. 21, 2016, revised Jan. 21, 2015, 1-75.

Jamali, Nadeem, et al., "A Scalable Approach to Multi-Agent Resource Acquisition and Control", 4th International Joint Conference on Autonomous Agents and Multiagent Systems (AAMAS 2005), Jul. 25-29, 2005, 868-875.

\* cited by examiner

DISTRIBUTION OF RESOURCES AMONG ACTOR INSTANCES

TECHNICAL FIELD

Embodiments presented herein relate to a method, a runtime environment, a computer program, and a computer program product for distributing resource units among instances of actors.

BACKGROUND

In communications networks, there may be a challenge to obtain good performance and capacity for a given communications protocol, its parameters and the physical environment in which the communications network is deployed.

Some network subscriptions could come with a limited amount of resource units to be used for different services in the communications networks. The network subscriber could get a notice when about to reach the limit of used resource units, get limited service or be cut of from service when the limit is reached. Network subscription systems are commonly centrally controlled and/or have only a single entity consuming the amount of resource units, e.g. a cellular phone having its amount of resource units controlled by a charging system of a cellular network operator. Some charging systems enable end-users to have monitor usage of resource units and allow the end-user to set a limit on resource units available for service usage.

A runtime environment can allow application modules, denoted actors, to be deployed distributed over several devices (where each device comprises a runtime environment). In general terms, actors can be regarded as parts of a distributed application that communicate with messages, see http://arxiv.org/abs/1008.1459 (as accessed on 21 Nov. 2016). Actors have conditions to guide placement of an instance of the actor on a runtime environment. Runtime environments have attributes that describe the runtime environment functionality as well as other information. Deployment of actors on any capable runtime (i.e., the execution environment on a device enables a general use of Internet of Things (IoT); other IoT frameworks might have fixed actions on a specific device. One of the main differences is that an actor instance can be migrated between runtimes.

For example in IoT scenarios, or other scenarios where runtime environments and actors as disclosed above are used, the end-user could utilize many physical devices and may use more services than when using a traditional cellular phone and share a limited amount of resource units to be spread between the runtime environments. In scenarios where runtime environments and actors are used, devices as well as services could disintegrate between network operators. Hence, neither the services nor the utilized devices could be regarded single entities. This could make it difficult to handle the network subscriptions of the utilized devices.

Hence, there is a need for an improved handling of resource units for services used by runtime environments.

SUMMARY

An object of embodiments herein is to provide efficient handling of resource units for services used by runtime environments.

According to a first aspect there is presented a method for distributing resource units among instances of actors. The method is performed by a requesting runtime environment. The method comprises providing, to responding runtime environments, a request for resource units to be used by at least one of the instances when run by the requesting runtime environment. The method comprises obtaining, from the responding runtime environments, indications of amount of resource units made available from a respective one of the responding runtime environments to the requesting runtime environment. The method comprises determining, based on the obtained indications, individual amounts of resource units required by the requesting runtime environment from each of the responding runtime environments. The method comprises indicating, to the responding runtime environments, said individual amounts of resource units required by the requesting runtime environment.

According to a second aspect there is presented a runtime environment for distributing resource units among instances of actors. The runtime environment acts as a requesting runtime environment and comprises processing circuitry. The processing circuitry is configured to cause the runtime environment to provide, to responding runtime environments, a request for resource units to be used by at least one of the instances when run by the requesting runtime environment. The processing circuitry is configured to cause the runtime environment to obtain, from the responding runtime environments, indications of amount of resource units made available from a respective one of the responding runtime environments to the requesting runtime environment. The processing circuitry is configured to cause the runtime environment to determine, based on the obtained indications, individual amounts of resource units required by the requesting runtime environment from each of the responding runtime environments. The processing circuitry is configured to cause the runtime environment to indicate, to the responding runtime environments, said individual amounts of resource units required by the requesting runtime environment.

According to a third aspect there is presented a runtime environment for distributing resource units among instances of actors. The runtime environment acts as a requesting runtime environment and comprises processing circuitry and a storage medium. The storage medium stores instructions that, when executed by the processing circuitry, cause the runtime environment to perform operations, or steps. The operations, or steps, cause the runtime environment to provide, to responding runtime environments, a request for resource units to be used by at least one of the instances when run by the requesting runtime environment. The operations, or steps, cause the runtime environment to obtain, from the responding runtime environments, indications of amount of resource units made available from a respective one of the responding runtime environments to the requesting runtime environment. The operations, or steps, cause the runtime environment to determine, based on the obtained indications, individual amounts of resource units required by the requesting runtime environment from each of the responding runtime environments. The operations, or steps, cause the runtime environment to indicate, to the responding runtime environments, said individual amounts of resource units required by the requesting runtime environment.

According to a fourth aspect there is presented a runtime environment for distributing resource units among instances of actors. The runtime environment acts as a requesting runtime environment. The runtime environment comprises a provide module configured to provide, to responding runtime environments, a request for resource units to be used by at least one of the instances when run by the requesting runtime environment. The runtime environment comprises an obtain module configured to obtain, from the responding runtime environments, indications of amount of resource units made available from a respective one of the responding runtime environments to the requesting runtime environment. The runtime environment comprises a determine module configured to determine, based on the obtained indications, individual amounts of resource units required by the requesting runtime environment from each of the responding runtime environments. The runtime environment comprises an indicate module configured to indicate, to the responding runtime environments, said individual amounts of resource units required by the requesting runtime environment.

According to a fifth aspect there is presented a computer program for distributing resource units among instances of actors, the computer program comprising computer program code which, when run on processing circuitry of a runtime environment acting as a requesting runtime environment, causes the runtime environment to perform a method according to the first aspect.

According to a sixth aspect there is presented a method for distributing resource units among instances of actors. The method is performed by a responding runtime environment. The method comprises obtaining, from a requesting runtime environment, a request for resource units to be used by at least one of the instances when run by the requesting runtime environment. The method comprises providing, to the requesting runtime environment, an indication of amount of resource units made available from the responding runtime environment to the requesting runtime environment. The method comprises obtaining, from the requesting runtime environment, an indication of an individual amount of resource units required by the requesting runtime environment.

According to a seventh aspect there is presented a runtime environment for distributing resource units among instances of actors. The runtime environment acts as a responding runtime environment and comprises processing circuitry. The processing circuitry is configured to cause the runtime environment to obtain, from a requesting runtime environment, a request for resource units to be used by at least one of the instances when run by the requesting runtime environment. The processing circuitry is configured to cause the runtime environment to provide, to the requesting runtime environment, an indication of amount of resource units made available from the responding runtime environment to the requesting runtime environment. The processing circuitry is configured to cause the runtime environment to obtain, from the requesting runtime environment, an indication of an individual amount of resource units required by the requesting runtime environment.

According to an eighth aspect there is presented a runtime environment for distributing resource units among instances of actors. The runtime environment acts as a responding runtime environment and comprises processing circuitry and a storage medium. The storage medium stores instructions that, when executed by the processing circuitry, cause the runtime environment to perform operations, or steps. The operations, or steps, cause the runtime environment to obtain, from a requesting runtime environment, a request for resource units to be used by at least one of the instances when run by the requesting runtime environment. The operations, or steps, cause the runtime environment to provide, to the requesting runtime environment, an indication of amount of resource units made available from the responding runtime environment to the requesting runtime environment. The operations, or steps, cause the runtime environment to obtain, from the requesting runtime environment, an indication of an individual amount of resource units required by the requesting runtime environment.

According to a ninth aspect there is presented a runtime environment for distributing resource units among instances of actors. The runtime environment acts as a responding runtime environment. The runtime environment comprises an obtain module configured to obtain, from a requesting runtime environment, a request for resource units to be used by at least one of the instances when run by the requesting runtime environment. The runtime environment comprises a provide module configured to provide, to the requesting runtime environment, an indication of amount of resource units made available from the responding runtime environment to the requesting runtime environment. The runtime environment comprises an obtain module configured to obtain, from the requesting runtime environment, an indication of an individual amount of resource units required by the requesting runtime environment.

According to a tenth aspect there is presented a computer program for distributing resource units among instances of actors, the computer program comprising computer program code which, when run on processing circuitry of a runtime environment acts as a responding runtime environment, causes the runtime environment to perform a method according to the sixth aspect.

According to an eleventh aspect there is presented a computer program product comprising a computer program according to at least one of the fifth aspect and the tenth aspect and a computer readable storage medium on which the computer program is stored. The computer readable storage medium could be a non-transitory computer readable storage medium.

Advantageously these methods, these runtime environments, and these computer programs provide efficient handling of resource units for services used by the runtime environments.

Advantageously these methods, these runtime environments, and these computer programs provide efficient handling of resource units with lower latency than currently used mechanisms for handling of resource units.

Advantageously these methods, these runtime environments, and these computer programs offer a distributed approach to handle resource units frequently used by many simultaneous instances.

Advantageously these methods, these runtime environments, and these computer programs remove the need to communicate with a centrally controlled charging system about permission to access resource units.

It is to be noted that any feature of the first, second, third, fourth, fifth, sixth seventh, eight, ninth, tenth and eleventh aspects may be applied to any other aspect, wherever appropriate. Likewise, any advantage of the first aspect may equally apply to the second, third, fourth, fifth, sixth, seventh, eight, ninth, tenth, and/or eleventh aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
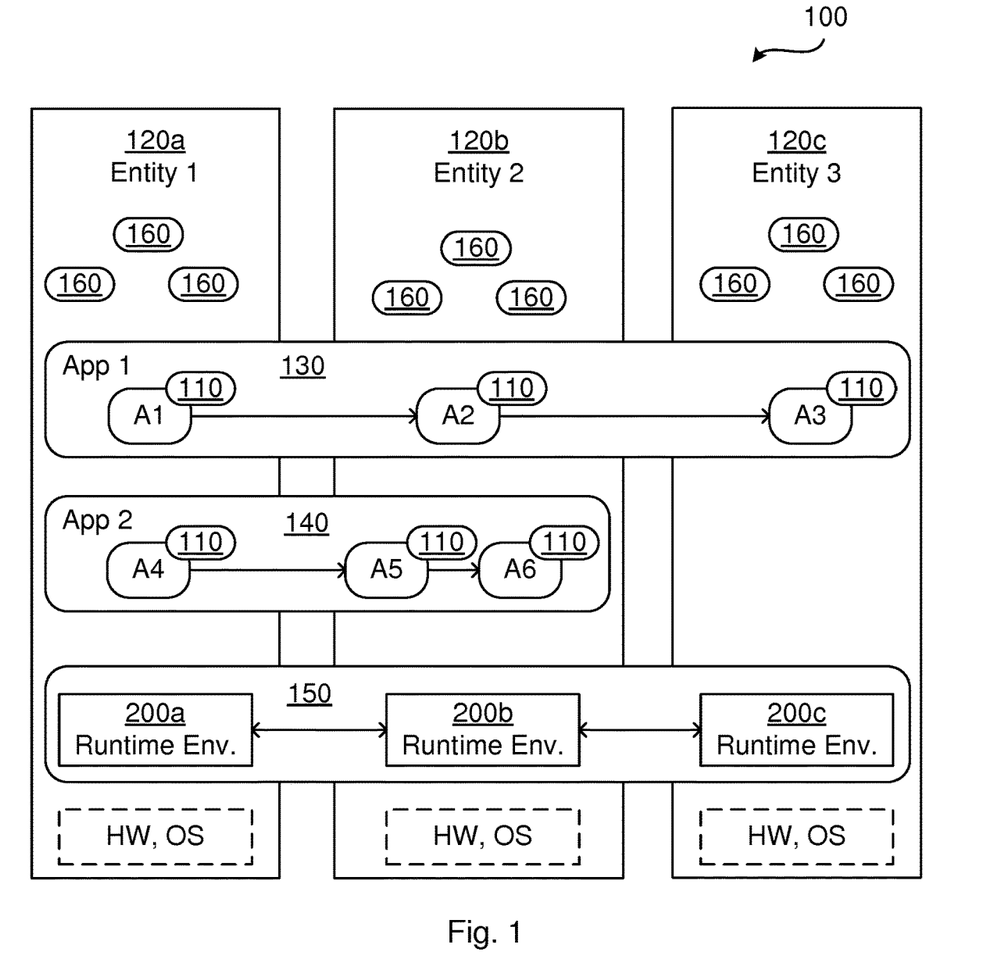
FIG. 1 is a schematic diagram illustrating a communications network according to embodiments.

FIG. 1 schematically illustrates a communications network 100. The communications network 100 comprises three entities (Entity 1, Entity 2, Entity 3) 120a, 120b, 120c, representing any combination of devices, compute nodes, and storage nodes. Each entity 120a. 120b, 120c may have its own hardware (HW) and may have its own operating system (OS). Alternatively, hardware and/or operating system is shared among at least two of the entities 120a, 120b, 120c.

The entities 120a, 120b, 120c host a first application (App 1) 130 and a second application (App 2) 140, each of which is distributed among the entities 120a, 120b, 120c. The applications 130, 140 are transparently distributed across the communications network 100 and comprise actors (A1, A2, A3, A4, A5, A6). There is not a one-to-one mapping between actors A1, A2, A3, A4, A5, A6 and entities 120a, 120b, 120c. For example, in the illustrative example of FIG. 1, actors A5 and A6 both reside on the same entity 120b (i.e., Entity 2). The actors (A1, A2, A3, A4, A5, A6) may access a resource object 160 by means of at least one of the runtime environments 200a, 200b, 200c. Accessing the resource object 160 requires the consumption of resource units. Each resource object 160 could be a file system, a sensor, an actuator, a network interface, or represent software license usage, network operation (such as the transmission and reception of messages), database accessor, other services etc., for which access is provided to by the runtime environments 200a, 200b, 200c.

The communications network 100 further comprises a distributed execution environment 150 formed by a set of network of runtime environments 200a, 200b, 200c, seen by the applications 130, 140 as a single platform.

Each actor A1, A2, A3, A4, A5, A6 can be run as one or more instances 110. That is, at least one of the instances 110 can be run by each of the runtime environments 200a, 200b, 200c.

As disclosed above it could be difficult to handle the network subscriptions spread over a multitude of entities, such as over multiple instances 110 of multiple runtime environments 200a, 200b, 200c.

The embodiments disclosed herein therefore relate to mechanisms for distributing resource units among instances 110 of actors A1, A2, A3, A4, A5, A6 and distributing resource units among instances 110 of actors A1, A2, A3, A4, A5, A6. In order to obtain such mechanisms there is provided a runtime environment acting as a requesting runtime environment 200a, a method performed by the runtime environment acting as a requesting runtime environment 200a, a computer program product comprising code, for example in the form of a computer program, that when run on processing circuitry of the runtime environment acting as a requesting runtime environment 200a, causes the runtime environment acting as a requesting runtime environment 200a to perform the method. In order to obtain such mechanisms there is further provided a runtime environment acting as a responding runtime environment 200b, 200c, a method performed by the runtime environment acting as a responding runtime environment 200b, 200c, and a computer program product comprising code, for example in the form of a computer program, that when run on processing circuitry of the runtime environment acting as a responding runtime environment 200b, 200c, causes the runtime environment acting as a responding runtime environment 200b, 200c to perform the method.

Figure 2:
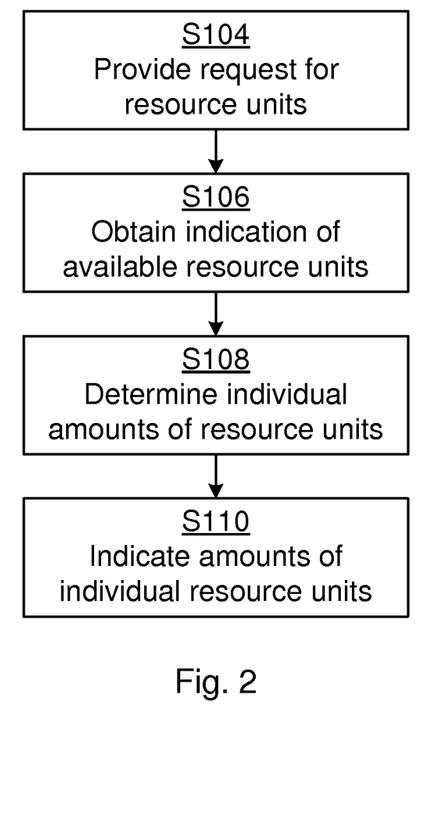
FIGS. 2, 3, 4, 5, 6, and 7 are flowcharts of methods according to embodiments.
Figure 3:
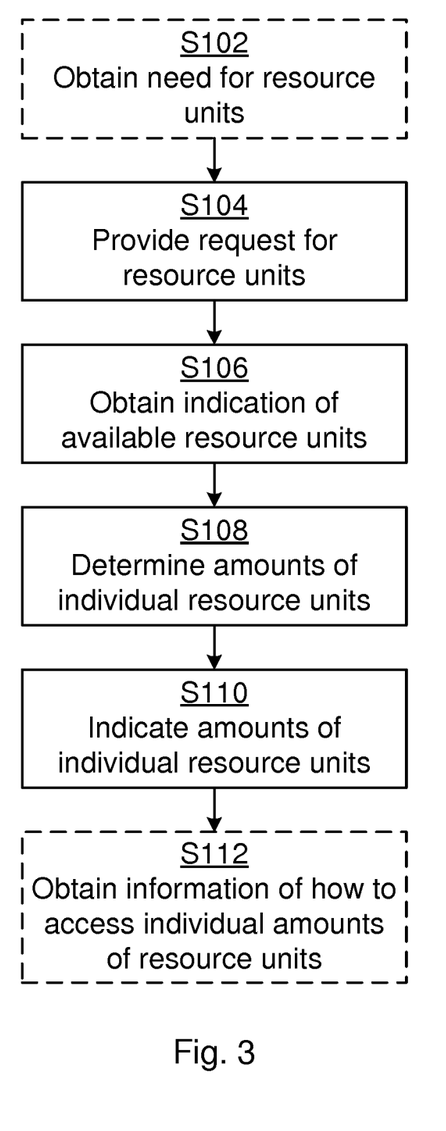
Figure 4:
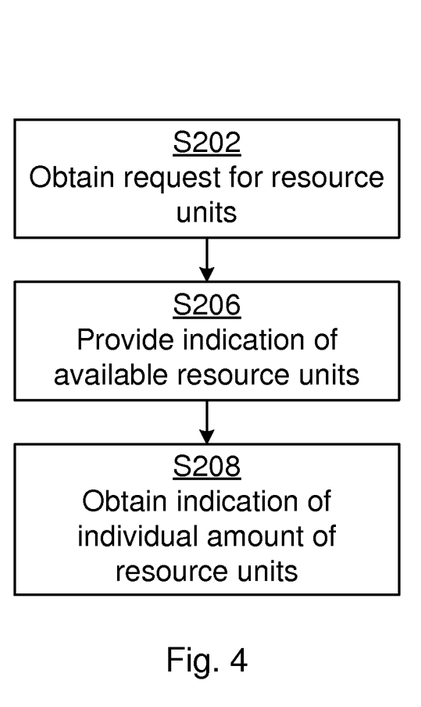
Figure 5:
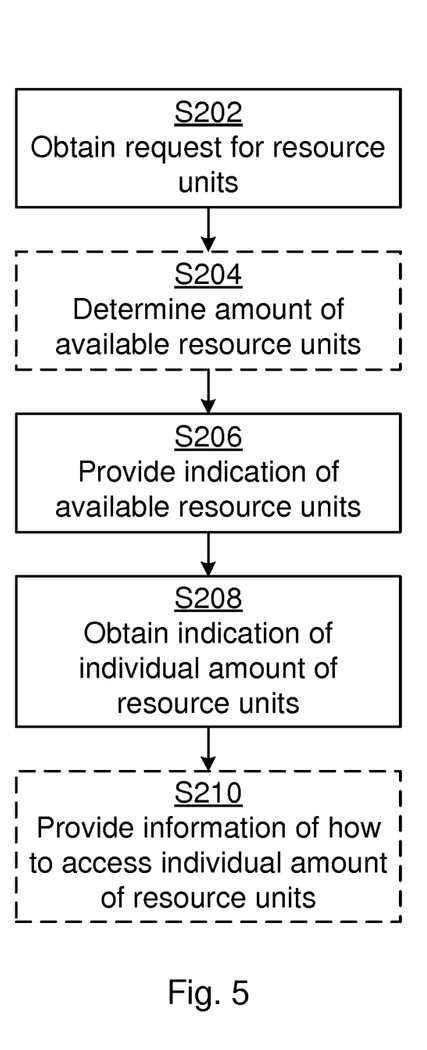

FIGS. 2 and 3 are flow charts illustrating embodiments of methods for distributing resource units among instances 110 of actors A1, A2, A3, A4, A5, A6 as performed by the runtime environment acting as a requesting runtime environment 200a. FIGS. 4 and 5 are flow charts illustrating embodiments of methods for distributing resource units among instances 110 of actors A1, A2, A3, A4, A5, A6 as performed by the runtime environment acting as a responding runtime environment 200b, 200c. The methods are advantageously provided as computer programs 1020a, 1020b.

Reference is now made to FIG. 2 illustrating a method for distributing resource units among instances 110 of actors A1, A2, A3, A4, A5, A6 as performed by the runtime environment acting as a requesting runtime environment 200a according to an embodiment.

Each runtime environment 200a, 200b, 200c will try to uphold its requirement for resource units by sending requests for access to resource units to peer runtime environments 200a, 200b, 200c. It is assumed that the runtime environment 200a, 200b, 200c are cooperating to use the resource units according to the requirements and hence, when possible, runtime environments 200a, 200b, 200c will offer transfer of access to resource units upon requests. Hence, the requesting runtime environment 200a is configured to perform step S104:

S104: The requesting runtime environment 200a provides, to responding runtime environments 200b, 200c, a request for resource units to be used by at least one of the instances 110 when run by the requesting runtime environment 200a.

It is assumed that the request is received by, and responded to, the responding runtime environments 200b, 200c, see steps S202, S206 below. Hence, the requesting runtime environment 200a is configured to perform step S106:

S106: The requesting runtime environment 200a obtains, from the responding runtime environments 200b, 200c, indications of amount of resource units made available from a respective one of the responding runtime environments 200b, 200c to the requesting runtime environment 200a.

In this respect it is the instances 110 of actors A1, A2, A3, A4, A5, A6 on the responding runtime environments 200b, 200c that make available the resource units. The responding runtime environments 200b, 200c may be regarded as only be the executors which could have several instances 110 of actors A1, A2, A3, A4, A5, A6. Thus, the instances 110 of actors A1, A2, A3, A4, A5, A6 could contribute different amounts of resource units as well as having different means of transferring the resource units. Hence, according to an embodiment the indications of amount of resource units comprise individual indications of amount of resource units for each instance 110 of the actors A1, A2, A3, A4, A5, A6 as run by the responding runtime environments 200b, 200c.

The indications obtained from the responding runtime environments 200b, 200c are by the requesting runtime environment 200a used to determine how much resource units to request from each of the responding runtime environments 200b, 200c. Hence, the requesting runtime environment 200a is configured to perform step S108:

S108: The requesting runtime environment 200a determines, based on the obtained indications, individual amounts of resource units required by the requesting runtime environment 200a from each of the responding runtime environments 200b, 200c. Examples of how the requesting runtime environment 200a determines the individual amounts of resource units will be disclosed below.

Once having determined these individual amounts of resource units the requesting runtime environment 200a indicates the individual amounts of resource units to the responding runtime environments 200b, 200c and is hence configured to perform step S10:

S110: The requesting runtime environment 200a indicates, to the responding runtime environments 200b, 200c, the individual amounts of resource units required by the requesting runtime environment 200a. Examples of how the requesting runtime environment 200a indicates the individual amounts of resource units to the responding runtime environments 200b, 200c will be disclosed below.

This provides a hierarchal way of handling use of resource units related to the resource object 160, without the need of a centrally controlled charging system.

Embodiments relating to further details of distributing resource units among instances 110 of actors A1, A2, A3, A4, A5, A6 as performed by the runtime environment acting as a requesting runtime environment 200a will now be disclosed.

The resource units could be used for runtime execution time, actor operation events (such as action firings), software license usage, network operation, and other services. Hence, an amount of the resource units could be mapped to a corresponding amount of runtime execution time, operation events, software license usage, network operation, etc.

Reference is now made to FIG. 3 illustrating methods for distributing resource units among instances 110 of actors A1, A2, A3, A4, A5, A6 as performed by the runtime environment acting as a requesting runtime environment 200a according to further embodiments. It is assumed that steps S104, S106, S108, S110 are performed as described above with reference to FIG. 2 and a thus repeated description thereof is therefore omitted.

There may be different ways for the requesting runtime environment 200a to determine that it needs to provide the request for resource units, as in step S104. The resource units could be required for running the instance 110 of an actor A1, A2, A3, A4, A5, A6 at the requesting runtime environment 200a and hence the needed resource units could correspond to as per actor instance requirements. Particularly, according to an embodiment the requesting runtime environment 200a is configured to perform step S102:

S102: The requesting runtime environment 200a obtains a need for the resource units from the at least one of the instances 110 (as run by the requesting runtime environment 200a).

In this respect, the needs may come from multiple sources such as the end-user, application developers, and/or device/service operators, as consolidated into per actor instance requirements.

There may be different ways for the requesting runtime environment 200a to obtain the indications in step S106. For example, the indications could comprise access to the resource units. Particularly, according to an embodiment at least one of the indications as obtained in step S106 is provided in a response. The response comprises information of how to access the amount of resource units made available from the responding runtime environment 200b, 200c providing the response.

There are different ways for how the requesting runtime environment 200a could access the resource units made available by the responding runtime environment 200b, 200c.

In some aspects, the access to the resource units is made by the requesting runtime environment 200a accepting or utilizing the determined amount of resource units. Hence no extra information beyond the determined amount of resource units and the surplus amount resource units is needed to be exchanged between the responding runtime environment 200b, 200c and the requesting runtime environment 200a.

In some aspects, the access to the resource units is made by the responding runtime environment 200b, 200c adding the determined amount of resource units to the other resource units of the instance 110 belonging to the requesting runtime environment 200a and by subtracting the determined amount of resource units from the resource units of the instance of the responding runtime environment 200b, 200c.

In some aspects, the access to the resource units is made by using a unique identifier when transferring the amount of resource units from the responding runtime environment 200b, 200c.

In some aspects, the access to the resource units is made by the requesting runtime 200a first obtaining and then sending a signed transfer message to the responding runtime environment 200b, 200c.

In some aspects, a blockchain is used during the transfer of resource unit amounts between the instances 110.

In some aspects, there exists accounting of resource units, where instances 110 can make withdrawals and deposits. The access to the resource units is made by including a token that allow a single withdrawal from an account of one instance 110 and the corresponding deposit into the account of another instance 110.

In some aspects, the token is signed by the instance 110 from which the amount of resource units is withdrawn.

It could thus be that the responding runtime environment 200b, 200c provides access to resource units and that this is indicated in the indications obtained by the requesting runtime environment 200a in step S106. However, the requesting runtime environment 200a could in step S108 determine that the requesting runtime environment 200a does not need the full amount of resource units being made available to the requesting runtime environment 200a. Hence, according to an embodiment the indicating of the individual amount of resource units required in step S110 comprises information of how (the responding runtime environment 200b, 200c is) to access surplus resource units.

Alternatively, access to the resource units is not provided in the indications obtained by the requesting runtime environment 200a in step S106. In such scenarios information regarding how the requesting runtime environment 200a could access the resource units could be provided separately. Hence, according to an embodiment the requesting runtime environment 200a is configured to perform step S112:

S112: The requesting runtime environment 200a obtains information of how to access the individual amounts of resource units from the responding runtime environments 200b, 200c.

In some aspects at least some of the responding runtime environments 200b, 200c do not provide an explicit response to the request provided by the requesting runtime environment 200a in step S104. In order for the requesting runtime environment 200a to know if a response is sent by each individual responding runtime environment 200b, 200c or not, the requesting runtime environment 200a could start a timer when providing the request in step S104. Hence, at least one of the obtained indications is defined by absence of a response, within a response time interval, from respective at least one of the responding runtime environment 200b, 200c. That is, the response time interval could be defined by expiry of the timer.

There may be different ways for the requesting runtime environment 200a to determine the individual amounts of resource units in step S108. According to an embodiment the individual amounts of resource units are determined such that an equal amount is requested from each of the responding runtime environments 200b, 200c from which the indications are obtained in respective responses. It could be that the individual amounts of resource units are determined such that an equal amount is requested from each of the instances 110 run by the responding runtime environments 200b, 200c. According to a further embodiment the individual amounts of resource units are determined to be proportional to the indicated amounts of resource units made available from the responding runtime environments 200b, 200c. It could be that the individual amounts of resource units are determined to be proportional to the individual indications of amount of resource units for each instance 110 of the actors A1, A2, A3, A4, A5, A6 as run by the responding runtime environments 200b, 200c.

In some aspects the determination of the individual amounts of resource units in step S108 is based on information received from the responding runtime environments 200b, 200c. In an embodiment the indications of amount of resource units as obtained in step S110 thus comprise resource unit information of the responding runtime environments 200b, 200c. The resource unit information could comprise individual resource unit information for each instance 110 of the actors A1, A2, A3, A4, A5, A6 as run by the responding runtime environments 200b, 200c. Then, the individual amounts of resource units could be determined based on the resource unit information.

Reference is now made to FIG. 4 illustrating a method for distributing resource units among instances 110 of actors A1, A2, A3, A4, A5, A6 as performed by the runtime environment acting as a responding runtime environment 200b, 200c according to an embodiment.

As disclosed above, the requesting runtime environment 200a in step S104 provides a request to the responding runtime environment 200b, 200c. It is assumed that this request is received by the responding runtime environment 200b, 200c. Hence, the responding runtime environment 200b, 200c is configured to perform step S202:

S202: The responding runtime environment 200b, 200c obtains, from the requesting runtime environment 200a, a request for resource units to be used by at least one of the instances 110 when run by the requesting runtime environment 200a.

The responding runtime environment 200b, 200c responds to the request and is hence configured to perform step S206:

S206: The responding runtime environment 200b, 200c provides, to the requesting runtime environment 200a, an indication of amount of resource units made available from the responding runtime environment 200b, 200c to the requesting runtime environment 200a. As disclosed above, in this respect it is the instances 110 of actors A1, A2, A3, A4, A5, A6 on the responding runtime environments 200b, 200c that make available the resource units.

As disclosed above, according to an embodiment the indication of amount of resource units comprises individual indications of amount of resource units for each instance 110 of the actors A1, A2, A3, A4, A5, A6 as run by the responding runtime environment 200b, 200c.

As disclosed above, the requesting runtime environment 200a in step S110 indicates individual amounts of resource units required by the requesting runtime environment 200a to the responding runtime environment 200b, 200c. Hence, the responding runtime environment 200b, 200c is configured to perform step S208:

S208: The responding runtime environment 200b, 200c obtains, from the requesting runtime environment 200a, an indication of an individual amount of resource units required by the requesting runtime environment 200a.

Embodiments relating to further details of distributing resource units among instances 110 of actors A1, A2, A3, A4, A5, A6 as performed by the runtime environment acting as a responding runtime environment 200b, 200c will now be disclosed.

Reference is now made to FIG. 5 illustrating methods for distributing resource units among instances 110 of actors A1, A2, A3, A4, A5, A6 as performed by the runtime environment acting as a responding runtime environment 200b, 200c according to further embodiments. It is assumed that steps S202, S206, S208 are performed as described above with reference to FIG. 4 and a thus repeated description thereof is therefore omitted.

Obtained the request for resource units in step S202 could trigger the responding runtime environment 200b, 200c to determine how much resource units to make available for the requesting runtime environment 200a. Hence, according to an embodiment the responding runtime environment 200b, 200c is configured to perform step S204:

S204: The responding runtime environment 200b, 200c determines the amount of resource units made available from the responding runtime environment 200b, 200c.

There may be different ways for the responding runtime environment 200b, 200c to determine the amount of resource units. According to an embodiment the amount of resource units made available from the responding runtime environment 200*b*, 200*c* is determined based on having at least one other of the instances 110 run by the responding runtime environment 200*b*, 200*c*. In an embodiment the amount of resource units made available from the responding runtime environment 200*b*, 200*c* is determined based on a minimum resource unit usage by the responding runtime environment 200*b*, 200*c*.

As disclosed above, according to an embodiment the indication of amount of resource units as provided in step S206 comprises resource unit information of the responding runtime environment 200*b*, 200*c*.

As disclosed above, according to an embodiment the indication of amount of resource units made available from the responding runtime environment 200*b*, 200*c* as provided in step S206 is provided in a response. The response comprises information of how (the requesting runtime environment 200*a* is) to access the amount of resource units made available from the responding runtime environment 200*b*, 200*c*.

As disclosed above, according to an embodiment the indication of individual amount of resource units required comprises information of how to access surplus resource units.

As disclosed above, information regarding how the requesting runtime environment 200*a* could access the resource units could be provided separately. Hence, according to an embodiment the responding runtime environment 200*b*, 200*c* is configured to perform step S204:

S210: The responding runtime environment 200*b*, 200*c* provides information of how to access the individual amount of resource units to the requesting runtime environment 200*a*.

Figure 6:
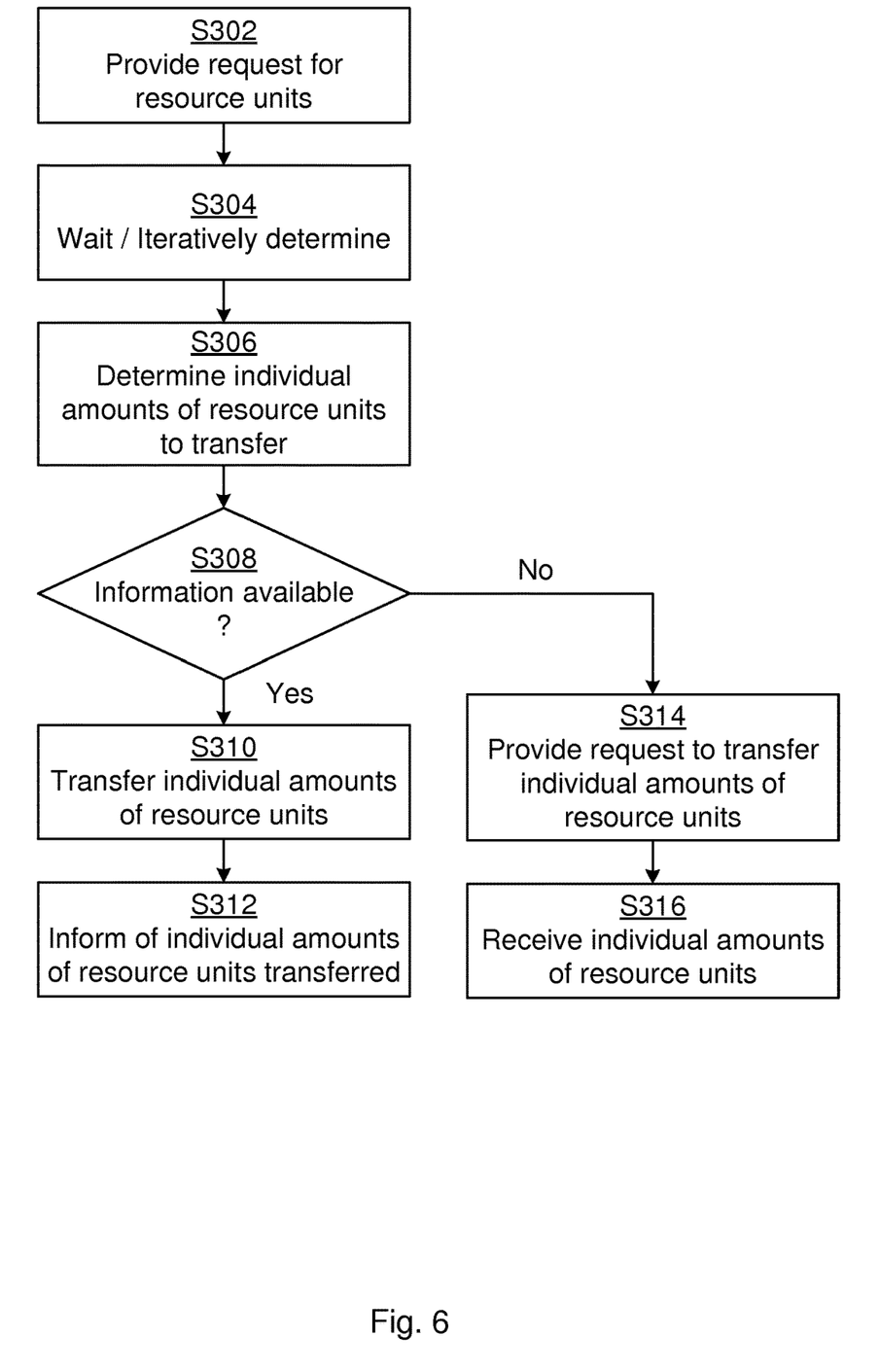

Step 1: The requesting runtime environment 200*a* sends a message comprising a request for a total amount A of resource units to all reachable responding runtime environments 200*b*, 200*c*. The message could comprise information such as weight of instances 110 of the requesting runtime environment 200*a*, priority of instances 110 of the requesting runtime environment 200*a*, current allowance of resource units of instances 110 of the requesting runtime environment 200*a*, etc.

Step 2: Each responding runtime environment 200*b*, 200*c* responds to the request by sending a message comprising information of the maximum amount Bx of resource units for which access is to be made by the requesting runtime environment 200*a* from responding runtime environment x. The message could comprise information of weight of instances 110 of the responding runtime environments 200*b*, 200*c*, priority of instances 110 of the responding runtime environments 200*b*, 200*c*, current allowance of resource units of the instances 110 of the responding runtime environments 200*b*, 200*c*, etc. The message could comprise (security) information so that the requesting runtime environment 200*a* could access the resource units up to a specified amount (or see, step 4 below).

There are different ways for the responding runtime environments 200*b*, 200*c* to determine Bx. For example, Bx could be determined as being equal to the amount of resource units available to responding runtime environment x subtracted by the amount of resource units needed to execute the other instances 110 specified number of times. For example, Bx could be determined as being equal to the amount of resource units available to responding runtime environment x the amount of resource units needed to execute the other instances 110 specified time period based on history and/or predicted cost. For example, Bx could be determined as being equal to the amount of resource units available to responding runtime environment x subtracted by a set minimum level of resource units. For example, Bx could be determined based on information in the message comprising the request. For example, the responding runtime environments 200*b*, 200*c* may only make available a non-zero amount Bx when the requested amount of resource units is for an instance 110 at the requesting runtime environment 200*a* where the instance 110 has a priority value at, below, or above a certain priority level. For example, the responding runtime environments 200*b*, 200*c* may use relative weights between the weight(s) of the instance 110 of the requesting runtime environment 200*a* and the weight(s) of the other instances 110 of the responding runtime environments 200*b*, 200*c* to scale the amount Bx. The higher the relative weights the higher amount of resource units is made access to for the requesting runtime environment 200*a*. When the amount of resource units currently made available to the requesting runtime environment 200*a* is within a threshold from a previous recent request from the requesting runtime environment 200*a* it could be assumed that the last request did not collect the needed amount of resources A. The responding runtime environments 200*b*, 200*c* could therefore temporarily assign the instance 110 of the requesting runtime environment 200*a* a higher priority or weight when determining Bx.

Step 3: The requesting runtime environment 200*a*, when a timer has expired or when a certain number of responses has been received, determines the amount Cx of resource units for which the requesting runtime environment 200*a* need access to from each responding runtime environment x. It could be that Cx<Bx. Alternatively, the requesting runtime environment 200*a* could iteratively determine Cx according to rules for each response until the amount of resource units A is reached.

There are different ways for the requesting runtime environment 200*a* to determine Cx. For example, Cx could be determined such that an equal amount of resource units is made access to from all responding runtime environments 200*b*, 200*c* (and/or instances 110 run by the responding runtime environments 200*b*, 200*c*) responding to reach the amount of resource units A. For example, Cx could be determined based on the amounts Bx from the responding runtime environments 200*b*, 200*c*. For example, Cx could be determined based on information included in the messages comprising the responses. For example, Cx could be determined using only those of the amounts Bx for instances 110 at the responding runtime environment 200*b*, 200*c* that have a priority level that at, below or above a certain priority level. For example, Cx could be determined based on the current amount of available resource units for the responding runtime environments 200*b*, 200*c*. For example, received weights included in the response can be used to scale Cx to reach the sum A when possible. The higher weight the lower amount of resource units determined.

For example, the requesting runtime environment 200*a* could select to access the Bx amounts of resource units from the instances 110 of the responding runtime environments 200*b*, 200*c* in priority order until the amount A of resource units is reached. For example, the requesting runtime environment 200*a* could select to access the Bx amounts of resource units from the instances 110 of the responding runtime environments 200*b*, 200*c* in weight order until the amount A of resource units is reached. For example, the requesting runtime environment 200*a* could select to access the Bx amounts of resource units from the instances 110 of the responding runtime environments 200*b*, 200*c* in their allowance size order until the amount A of resource units is reached.

Optionally, when in step 3 the amount A cannot be met, or if the offered amounts of resource units is only within a certain range above A, and end-user of the requesting runtime environment 200*a* could be notified to increase the total amount of available resource units or to take other actions.

Step 4: The requesting runtime environment 200*a* sends a request for access to the amount Cx of resource units to responding runtime environment x. If such information was already obtained above, step 4 can be skipped.

Step 5: The requesting runtime environment 200*a* receives information how to access the resource units from each responding runtime environment x. If step 4 was skipped the requesting runtime environment 200*a* informs the responding runtime environment x about the amount Cx of resource units that was made access to.

One particular embodiment for distributing resource units among instances 110 of actors A1, A2, A3, A4, A5, A6 based on at least some of the above disclosed embodiments as performed by the requesting runtime environment 200*a* will now be disclosed in detail.

S302: The requesting runtime environment 200*a* provides a request for resource units to be used by at least one of the instances 110 when run by the requesting runtime environment 200*a*.

S304: The requesting runtime environment 200*a* waits for responses from the responding runtime environments 200*b*, 200*c* and, optionally, iteratively determines individual amounts of resource units required by the requesting runtime environment 200*a* from each of the responding runtime environments 200*b*, 200*c* based on thus far received responses.

S306: The requesting runtime environment 200*a* determines individual amounts of resource units required by the requesting runtime environment 200*a* from each of the responding runtime environments 200*b*, 200*c* based the received responses (unless already determined in step S304).

S308: The requesting runtime environment 200*a* checks if the responses comprise information for the requesting runtime environment 200*a* to access the requested amounts of resource units. If yes, then step S310 is entered, and if no, then step S314 is entered.

S310: The requesting runtime environment 200*a* accesses the requested amount of resource units (so as to transfer the requested amount of resource units from the responding runtime environments 200*b*, 200*c*).

S312: The requesting runtime environment 200*a* informs the responding runtime environments 200*b*, 200*c* that the requesting runtime environment 200*a* has accessed (or transferred) the requested amount of resource units.

S314: The requesting runtime environment 200*a* provides a request to the responding runtime environments 200*b*, 200*c* to access the requested amount of resource units (so as to transfer the requested amount of resource units from the responding runtime environments 200*b*, 200*c*).

S316: The requesting runtime environment 200*a* accesses the requested amount of resource units (upon having received information how to access the resource units from the responding runtime environments 200*b*, 200*c*).

Figure 7:
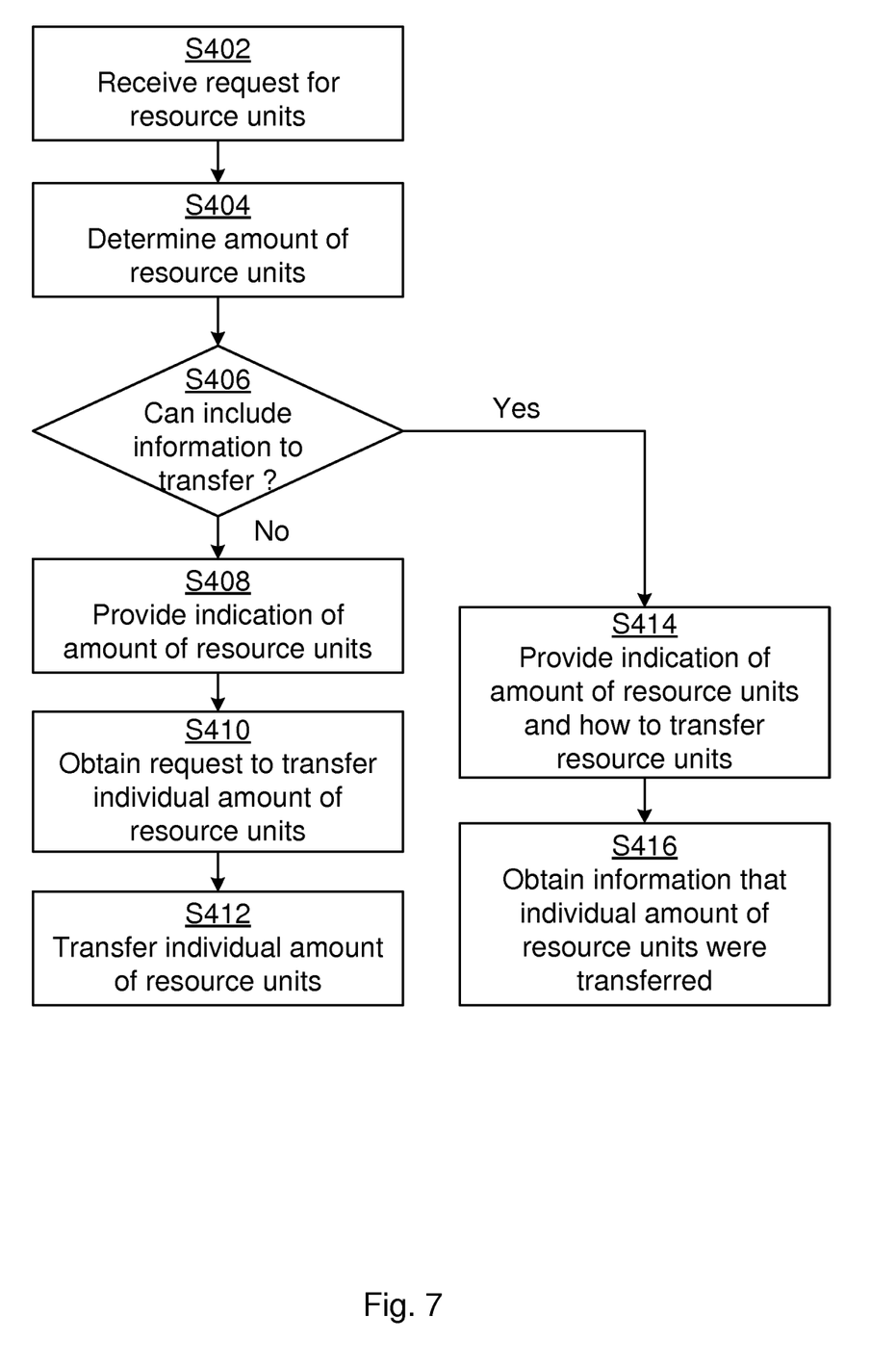

One particular embodiment for distributing resource units among instances 110 of actors A1, A2, A3, A4, A5, A6 based on at least some of the above disclosed embodiments as performed by the responding runtime environment 200*b*, 200*c* will now be disclosed in detail.

S402: The responding runtime environment 200*b*, 200*c* obtain, from the requesting runtime environment 200*a*, a request for resource units to be used by at least one of the instances 110 when run by the requesting runtime environment 200*a*.

S404: The responding runtime environment 200*b*, 200*c* determines the amount of resource units made available from the responding runtime environment 200*b*, 200*c*.

S406: The responding runtime environment 200*b*, 200*c* determines if information of how to access (or transfer) the resource units is to be included in the response to the requesting runtime environment 200*a*. If no, then step S408 is entered, and if yes, then step S414 is entered.

S408: The responding runtime environment 200*b*, 200*c* provides, to the requesting runtime environment 200*a*, an indication of the amount of resource units made available from the responding runtime environment 200*b*, 200*c* to the requesting runtime environment 200*a*.

S410: The responding runtime environment 200*b*, 200*c* obtains, from the requesting runtime environment 200*a*, an indication of an individual amount of resource units required by the requesting runtime environment 200*a*.

S412: The responding runtime environment 200*b*, 200*c* provides information of how to access the individual amount of resource units to the requesting runtime environment 200*a*, for example so that the requesting runtime environment to transfer the requested amount of resource units from the responding runtime environments 200*b*, 200*c*.

S414: The responding runtime environment 200*b*, 200*c* provides information to the requesting runtime environment 200*a* of the amount of resource units made available by the responding runtime environment 200*b*, 200*c* the individual amount of resource units can be accessed.

S416: The responding runtime environment 200*b*, 200*c* obtains an indication that the requesting runtime environment 200*a* has accessed (or transferred) the requested amount of resource units.

Figure 8:
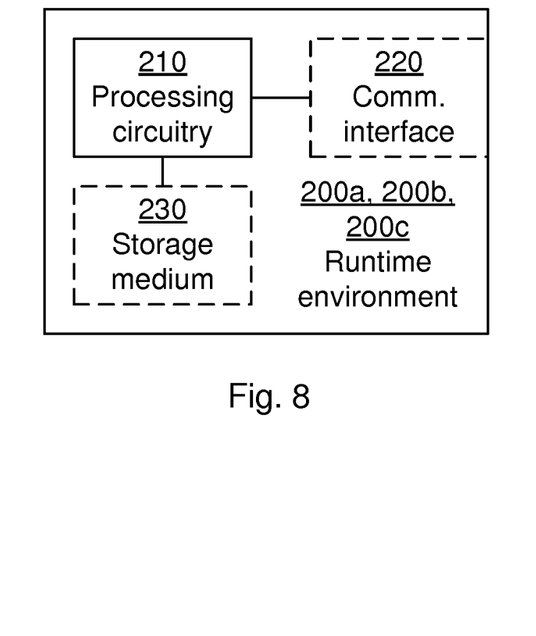
FIG. 8 is a schematic diagram showing functional units of a runtime environment according to an embodiment.

FIG. 8 schematically illustrates, in terms of a number of functional units, the components of a runtime environment 200*a*, 200*b*, 200*c* according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1010*a* (as in FIG. 10), e.g. in the form of a storage medium 230. The processing circuitry 210 may further be provided as at least one application specific integrated circuit (ASIC), or field programmable gate array (FPGA).

Particularly, the processing circuitry 210 is configured to cause the runtime environment 200*a*, 200*b*, 200*c* to perform a set of operations, or steps, S102-S112, S202-S210, S302-S316, S402-S416, as disclosed above. For example, the storage medium 230 may store the set of operations, and the processing circuitry 210 may be configured to retrieve the set of operations from the storage medium 230 to cause the runtime environment 200*a*, 200*b*, 200*c* to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The runtime environment 200*a*, 200*b*, 200*c* may further comprise a communications interface 220 for communications at least with another runtime environment 200*a*, 200*b*, 200c. As such the communications interface 220 may comprise one or more transmitters and receivers, comprising analogue and digital components.

The processing circuitry 210 controls the general operation of the runtime environment 200a, 200b, 200c e.g. by sending data and control signals to the communications interface 220 and the storage medium 230, by receiving data and reports from the communications interface 220, and by retrieving data and instructions from the storage medium 230. Other components, as well as the related functionality, of the runtime environment 200a, 200b, 200c are omitted in order not to obscure the concepts presented herein.

Figure 9:
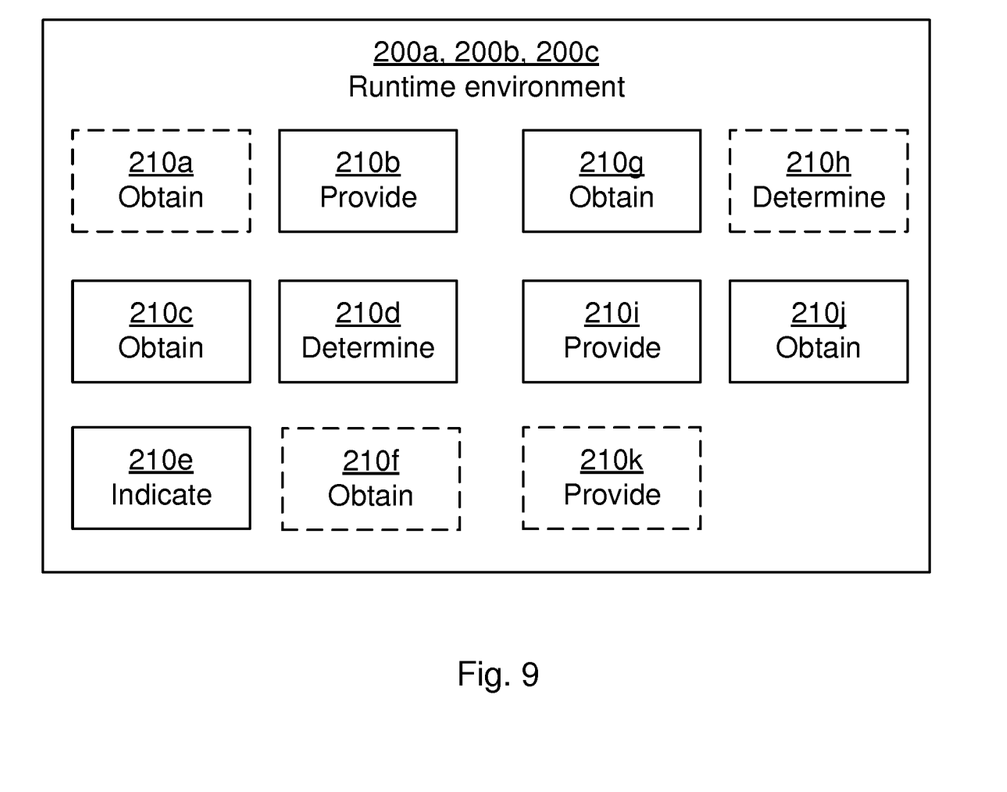
FIG. 9 is a schematic diagram showing functional modules of a runtime environment according to an embodiment.

FIG. 9 schematically illustrates, in terms of a number of functional modules, the components of a runtime environment 200a, 200b, 200c according to an embodiment.

In order for the runtime environment to act as a requesting runtime environment 200a the runtime environment comprises a provide module 210b configured to perform step S104, an obtain module 210c configured to perform step S106, a determine module 210d configured to perform step S108, and an indicate module 210e configured to perform step S110. The runtime environment acting as a requesting runtime environment 200a may further comprise a number of optional functional modules, such as any of an obtain module 210a configured to perform step S102, and an obtain module 210f configured to perform step S112.

In order for the runtime environment to act as a responding runtime environment 200b, 200c the runtime environment comprises an obtain module 210g configured to perform step S202, a provide module 210i configured to perform step S206, and an obtain module 210j configured to perform step S208. The runtime environment acting as a responding runtime environment 200b, 200c may further comprise a number of optional functional modules, such as any of a determine module 210h configured to perform step S204, and a provide module 210k configured to perform step S210.

In general terms, each functional module 210a-210k may be implemented in hardware or in software. Preferably, one or more or all functional modules 210a-210k may be implemented by the processing circuitry 210, possibly in cooperation with functional units 220 and/or 2300. The processing circuitry 210 may thus be arranged to from the storage medium 230 fetch instructions as provided by a functional module 210a-210k and to execute these instructions, thereby performing any steps of the runtime environment 200a, 200b, 200c as disclosed herein.

Figure 10:
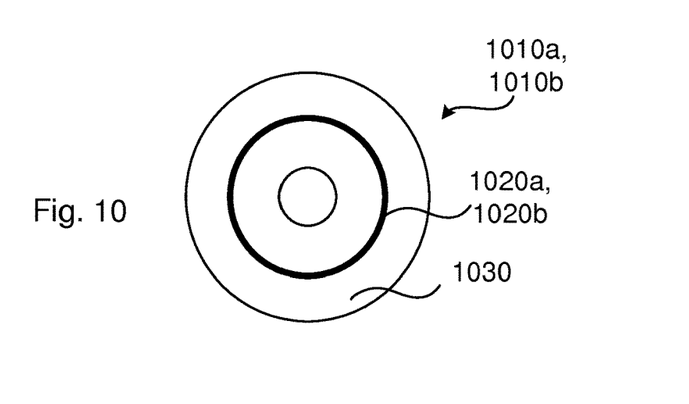
FIG. 10 shows one example of a computer program product comprising computer readable means according to an embodiment.

FIG. 10 shows one example of a computer program product 1010a, 1010b comprising computer readable means 1030. On this computer readable means 1030, a computer program 1020a can be stored, which computer program 1020a can cause the processing circuitry 210 and thereto operatively coupled entities and devices, such as the communications interface 220 and the storage medium 230, to execute methods according to embodiments described herein. The computer program 1020a and/or computer program product 1010a may thus provide means for performing any steps of the runtime environment acting as a requesting runtime environment 200a as herein disclosed. On this computer readable means 1030, a computer program 1020b can be stored, which computer program 1020b can cause the processing circuitry 310 and thereto operatively coupled entities and devices, such as the communications interface 320 and the storage medium 330, to execute methods according to embodiments described herein. The computer program 1020b and/or computer program product 1010b may thus provide means for performing any steps of the runtime environment acting as a responding runtime environment 200b, 200c as herein disclosed.

In the example of FIG. 10, the computer program product 1010a, 1010b is illustrated as an optical disc, such as a CD (compact disc) or a DVD (digital versatile disc) or a Blu-Ray disc. The computer program product 1010a, 1010b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1020a, 1020b is here schematically shown as a track on the depicted optical disk, the computer program 1020a, 1020b can be stored in any way which is suitable for the computer program product 1010a, 1010b.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for distributing resource units among instances of actors, the method being performed by a requesting runtime environment of a first physical device, the method comprising:
  providing, to responding runtime environments of respective further physical devices, a request for resource units to be used by at least one of the instances when run by the requesting runtime environment;
  obtaining, from the responding runtime environments, indications of respective amounts of resource units made available from the responding runtime environments to the requesting runtime environment, each responding runtime environment associated with one or more other ones of the instances;
  determining, based on the obtained indications, individual amounts of resource units required by the requesting runtime environment from each of the responding runtime environments; and
  indicating, to the responding runtime environments, the individual amounts of resource units required by the requesting runtime environment;
  wherein the resource units are consumable resource units shared among the instances and used for authorizing use of communication services by individual ones of the instances, and wherein the resource units are consumed from a limited amount of resource units provided by a user subscription associated with the instances.

2. The method according to claim 1, wherein the indications of the respective amounts of resource units comprise individual indications of an amount of resource units for each instance of the actors as run by the responding runtime environments.

3. The method according to claim 1, wherein at least one of the obtained indications is provided in a response, the response comprising information of how to access the amount of resource units made available from the responding runtime environment providing the response.

4. The method according to claim 3, wherein indicating the individual amount of resource units required comprises indicating information of how to access surplus resource units.

5. The method according to claim 1, further comprising:
obtaining information of how to access the individual amounts of resource units from the responding runtime environments.

6. The method according to claim 1, wherein the individual amounts of resource units are determined such that an equal amount is requested from each of the responding runtime environments from which the indications are obtained in respective responses.

7. The method according to claim 1, wherein the individual amounts of resource units are determined to be proportional to the indicated amounts of resource units made available from the responding runtime environments.

8. The method according to claim 1, wherein the responding resource environments each provide respective resource unit information that includes the indications of the amount of resource units made available by the responding runtime environment.

9. The method according to claim 8, wherein the respective resource unit information from each responding runtime environment indicates individual amounts of resource units available from each of the one or more instances associated with the responding runtime environment.

10. The method according to claim 1, wherein at least one of the obtained indications is defined by absence of a response, within a response time interval, from respective at least one of the responding runtime environments.

11. The method according to claim 1, further comprising providing the request in response to determining that one or more of the at least one of the instances run in the requesting runtime environment require resource units for authorizing use of a communication service.

12. A method for distributing resource units among instances of actors, the method being performed by a responding runtime environment of a first physical device, the method comprising:
obtaining, from a requesting runtime environment of a further physical device, a request for resource units to be used by at least one of the instances when run by the requesting runtime environment;
providing, to the requesting runtime environment, an indication of an amount of resource units made available from the responding runtime environment to the requesting runtime environment, the responding runtime environment being associated with one or more other ones of the instances; and
obtaining, from the requesting runtime environment, an indication of an individual amount of resource units required by the requesting runtime environment;
wherein the resource units are consumable resource units shared among the instances and used for authorizing use of communication services by individual ones of the instances, and wherein the resource units are consumed from a limited amount of resource units provided under a user subscription associated with the instances.

13. The method according to claim 12, wherein the indication of the amount of resource units comprises individual indications of an amount of resource units for each instance of the actors as run by the responding runtime environment.

14. The method according to claim 12, wherein the provided indication of the amount of resource units made available from the responding runtime environment is provided in a response, the response comprising information of how to access the amount of resource units made available from the responding runtime environment.

15. The method according to claim 14, wherein the indication of the individual amount of resource units required comprises information of how to access surplus resource units.

16. The method according to claim 12, further comprising:
providing information of how to access the individual amount of resource units to the requesting runtime environment.

17. The method according to claim 12, further comprising:
determining the amount of resource units made available from the responding runtime environment.

18. The method according to claim 17, wherein the availability of resource units from the responding runtime environment depends on having at least one other of the instances run by the responding runtime environment.

19. The method according to claim 17, wherein the amount of resource units made available from the responding runtime environment is determined based on a minimum resource unit usage by the responding runtime environment.

20. The method according to claim 12, wherein the provided indication of the amount of resource units comprises resource unit information of the responding runtime environment.

21. A runtime environment of a first physical device, the runtime environment configured for distributing resource units among instances of actors and acting as a requesting runtime environment, runtime environment and comprising:
processing circuitry; and
a storage medium storing instructions that, when executed by the processing circuitry, cause the runtime environment to:
provide, to responding runtime environments of respective further physical devices, a request for resource units to be used by at least one of the instances when run by the requesting runtime environment;
obtain, from the responding runtime environments, indications of respective amounts of resource units made available from the responding runtime environments to the requesting runtime environment, each responding runtime environment associated with one or more other ones of the instances;
determine, based on the obtained indications, individual amounts of resource units required by the requesting runtime environment from each of the responding runtime environments; and
indicate, to the responding runtime environments, the individual amounts of resource units required by the requesting runtime environment;
wherein the resource units are consumable resource units shared among the instances and used for authorizing use of communication services by individual ones of the instances, and wherein the resource units are consumed from a limited amount of resource units provided under a user subscription associated with the instances.

22. A runtime environment of a first physical device, the runtime environment configured for distributing resource units among instances of actors and acting as a responding runtime environment, the runtime environment and comprising:
processing circuitry; and
a storage medium storing instructions that, when executed by the processing circuitry, cause the runtime environment to:

obtain, from a requesting runtime environment of a further physical device, a request for resource units to be used by at least one of the instances when run by the requesting runtime environment;

provide, to the requesting runtime environment, an indication of an amount of resource units made available from the responding runtime environment to the requesting runtime environment, the responding runtime environment being associated with one or more other ones of the instances; and obtain, from the requesting runtime environment, an indication of an individual amount of resource units required by the requesting runtime environment;

wherein the resource units are consumable resource units shared among the instances and used for authorizing use of communication services by individual ones of the instances, and wherein the resource units are consumed from a limited amount of resource units provided under a user subscription associated with the instances.

\* \* \* \* \*